United States Patent
Li

(10) Patent No.: US 6,691,108 B2
(45) Date of Patent: Feb. 10, 2004

(54) FOCUSED SEARCH ENGINE AND METHOD

(75) Inventor: Wen-Syan Li, Fremont, CA (US)

(73) Assignee: NEC Corporation, Tokyo (JP)

(*) Notice: Subject to any disclaimer, the term of this patent is extended or adjusted under 35 U.S.C. 154(b) by 233 days.

(21) Appl. No.: 09/735,447

(22) Filed: Dec. 12, 2000

(65) Prior Publication Data

US 2002/0099700 A1 Jul. 25, 2002

Related U.S. Application Data

(60) Provisional application No. 60/170,843, filed on Dec. 14, 1999.

(51) Int. Cl.$^7$ .............................................. G06F 17/30
(52) U.S. Cl. ................................ 707/3; 707/5; 707/10
(58) Field of Search ......................... 707/5, 3, 4, 104.1, 707/10, 7; 345/784; 709/221, 224

(56) References Cited

U.S. PATENT DOCUMENTS

| | | | |
|---|---|---|---|
| 6,178,419 B1 * | 1/2001 | Legh-Smith et al. | 707/5 |
| 6,349,307 B1 * | 2/2002 | Chen | 707/5 |
| 6,356,899 B1 * | 3/2002 | Chakrabarti et al. | 707/3 |
| 6,389,436 B1 * | 5/2002 | Chakrabarti et al. | 707/3 |
| 6,415,322 B1 * | 7/2002 | Jaye | 709/221 |
| 6,453,315 B1 * | 9/2002 | Weissman et al. | 707/3 |

OTHER PUBLICATIONS

Israel Ben–Shaul et al., "Adding Support for Dynamic and Focused Search with Fetuccino", Proceedings of the 8$^{th}$ World–Wide Web Conference, Toronto, Canada, May 1999.

Krishna Bharat et al., "Improved Algorithms for Topic Distillation in a Hyperlinked Environment", Proceedings from the 21$^{st}$ ACM SIGIR Conference, pp. 104–111, Melbourne Australia, Aug. 1998.

Sergey Brin et al., "The Anatomy of a Large–Scale Hypertextual Web Search Engine", Proceedings of the 7$^{th}$ World–Wide Web conference, Brisbane, Queensland, Australia, Apr. 1998.

Soumen Chakrabarti et al., "Focused Crawling: A New Approach to Topic–Specific Web Resource Discovery", Proceedings of the 8$^{th}$ World–Wide Web conference, Toronto, Canada, May 1999.

Soumen Chakrabarti et al., "Enhanced Hypertext Categorization Using Hyperlinks", Proceedings of the 1998 ACM SIGMOD conference, 1998.

Soumen Chakrabarti et al., "Automatic Resource Compilation by Analyzing Hyperlink Structure and Associated Text", Proceedings of the 7$^{th}$ World–Wide Web conference, pp. 65–74, Brisbane, Queensland, Australia, Apr. 1998.

Jeffrey Dean et al., "Finding Related Pages in the World Wide Web", Proceedings by Compaq Computer Corporation Systems Research Center.

Ravi Kumar et al., "Trawling the Web for Emerging Cyber–Communities", Published by Elsevier Science B.V., 1999.

George A. Miller et al., "Introduction to WordNet: An On–Line Lexical Database", Proceedings from WordNet, revised Aug., 1993.

Jinxi Xu et al., "Query Expansion Using Local and Global Document Analysis", Proceedings of the 19$^{th}$ Annual International ACM SIGIR Conference, Zurich, Switzerland, 1996.

* cited by examiner

Primary Examiner—Diane D. Mizrahi
(74) Attorney, Agent, or Firm—Sughrue Mion, PLLC

(57) ABSTRACT

A focused search engine and method are directed to crawling vast search spaces comprising markup language documents, for example. Both topic distillation and site distillation methodologies are incorporated into an integrated topic-focused search strategy. Categorization of search results may be initiated by the search engine itself; alternatively, topic categories of interest may be specified in conjunction with the original request for information.

67 Claims, 8 Drawing Sheets

Find NBA? — try to find information on the NBA strike!

| General Search Engine | A Cluster of Specialized Search Engines | |
|---|---|---|
| | *Sports* | *Business* |
| NBA 1998-99 Final | NBA 1998-99 Final | Revenue loss due to... |
| NBA 1998-99 Final | NBA 1998-99 Final | • |
| NBA 1998-99 Final | NBA 1998-99 Final | • |
| NBA 1998-99 Final | NBA 1998-99 Final | |
| | | *Auction* |
| NBA 1998-99 Final | *Entertainment* | MJ signed basketball |
| NBA 1998-99 Final | Dennis Rodman | • |
| NBA 1998-99 Final | • | • |
| NBA 1998-99 Final | • | |
| | | *Labor* |
| NBA 1998-99 Final | | NBA strike |
| NBA 1998-99 Final | *History* | • |
| NBA 1998-99 Final | Hall of fame | • |
| NBA 1998-99 Final | | |
| | • | *Books* |
| NBA 1998-99 Final | • | • |
| NBA 1998-99 Final | | • |
| NBA 1998-99 Final | *Shopping Sites* | |
| NBA 1998-99 Final | Tickets | |
| | NBA Goods | |

FIG. 1

Keyword Score Distributions

```
              Arts/Institutes/
-----------------------------------------------
NexTopixHomePage Category Keywords

• ──── art              Hub and Authority
   • ──── architecture     Hub and Authority
   • ──── school           Hub and Authority
   • ──── university       Hub and Authority
   • ──── history          Hub and Authority
   • ──── department       Hub and Authority
   • ──── design           Hub and Authority
   • ──── college          Hub and Authority
   • ──── center           Hub and Authority
   • ──── institute        Hub and Authority
   • ──── humanity         Hub and Authority
```

FIG. 5A

```
              Arts/Crafts/
-----------------------------------------------
NexTopixHomePage Category Keywords

• ──── art              Hub and Authority
   • ──── craft            Hub and Authority
   • ──── wood             Hub and Authority
   • ──── gift             Hub and Authority
   • ──── design           Hub and Authority
   • ──── hand             Hub and Authority
   • ──── quilt            Hub and Authority
   • ──── jewelry          Hub and Authority
   • ──── woodworking      Hub and Authority
   • ──── custom           Hub and Authority
   • ──── furniture        Hub and Authority
```

FIG. 5B

Site Distillation with Focused Topic CAR

Site Distillation with Focused Topic *NBA*

FOCUSED SEARCH ENGINE AND METHOD

This application claims the benefit of U.S. Provisional Application No. 60/170,843, filed Dec. 14, 1999, entitled "Focused Search Engine: Motivation, Functionalities and Design Principles," the disclosure of which is hereby incorporated by reference in its entirety.

BACKGROUND OF THE INVENTION

1. Field of the Invention

The present invention is generally related to locating information in search spaces comprising a plurality of documents, and more particularly to a focused search engine employing a method of focused crawling which incorporates both topic distillation and site distillation techniques.

2. Description of the Related Art

The rapid growth of the World Wide Web (the Web) poses a significant scalability problem for general purpose search engines; using conventional searching techniques, the typical search engine is required to collect a very large number of Web pages in order to perform indexing and classification during the process of locating pages which are relevant to the search. Focused searching, or "crawling," is a relatively new approach designed to address the scalability issue and to provide higher quality search results, i.e. Web pages that are more relevant with respect to a request for information concerning a specific topic.

An example of crawling involves a request for information related to a broad topic, for example, "jogging," focused on a more particular category. Relative to the broad topic of jogging, example queries or requests for information which may be issued to focused search engines might include, inter alia: a request for documents related to jogging in a sports category; a request for documents related to jogging in a health/fitness category; or a request for shopping sites which sell or specialize in merchandise related to jogging. Ideally, these three exemplary requests, each having a different fundamental objective, should return different results, given the different focus and purpose of each respective search.

One important shortcoming inherent in the methods of query processing employed by conventional search engines involves keyword frequency. Specifically, pages or documents containing keywords with a high term frequency (i.e. multiple occurrences of the same keyword) are routinely ranked higher in terms of relevance than other pages or documents which might potentially contain more relevant material, but which do not contain as many occurrences of the keyword. For example, in conventional searching techniques, a document containing five separate occurrences of a particular keyword is generally considered by the search engine to be more relevant than a document containing only three occurrences of that same keyword, even though the latter document may contain more insightful or more relevant information relative to the real objective of the search.

Another approach adopted by some conventional search techniques involves utilizing various methods of "link analysis" for the purpose of ranking pages according to relevance. Link analysis involves examining the hyperlinks which connect the various hyperlinked pages in the search space, and is based upon the theory that pages which contain similarly relevant material will be within a relatively small link radius. In other words, where a page has been identified as containing relevant material, these search methods seek additional pages which are linked to the known relevant page by exploring outgoing links and examining the pages that are accessible by those links. These methods are systematic and mechanical searches for keywords, however; neither the focus nor the context of the search is considered. As a consequence, many pages which are not related to the real objective of the search are, nevertheless, identified as relevant by such search methods.

There has been a continuing and growing need, therefore, for a focused search engine employing a method of focused searching which takes into consideration the hierarchical structure of Web pages while integrating techniques for both topic distillation as well as site distillation in crawling or focused searching. A method of focused searching, or a focused search engine employing such a method, should recognize different classifications of information and identify category-specific search terms which will assist in finding the most relevant documents related to an issued query or other request for information.

SUMMARY OF THE INVENTION

The method embodied in the focused search engine of the present invention addresses the foregoing and other shortcomings of conventional search engines by coordinating advanced topic distillation and site distillation technologies. In particular, the focused search methodology described herein is based upon hierarchically structured Web document classification categories; that is, a given Web document is typically categorized and indexed, to some extent, according to the subject matter addressed in its content, is linked to other documents or pages, for example, via hyperlinks, and is ordinarily located relatively "close" to other related documents containing similar information. The term "close" in this context refers to the relatively few hyperlinks required to navigate from one page to another page containing similar or related subject matter.

The various embodiments of a focused search engine may be related to two different schemes, each of which addresses an important aspect of focused crawling, namely, providing relevant information in usable form.

In accordance with one aspect of the present invention, for example, a focused search engine and method generally organize information responsive to a request or a query and present the results according to categories. By organizing search results in this manner, a focused search engine employing the inventive method described herein may provide categorized information; a search may easily be narrowed by selection of a particular category of interest from those categories recognized by the search engine.

In accordance with another aspect of the present invention, a focused search engine and method require or request the specification of explicit categories of interest as part of the original search. In other words, the category of interest which is the ultimate focus of the search may be determined or suggested by the system based upon the hierarchical structure of the Web classification system; alternatively, one or more categories of interest may be specified explicitly during formulation of the request for information.

Identifying the topic categories to be searched, or having those topic categories specified at the outset, enables a focused search engine and method to perform implicit query expansion; that is, category-specific keywords may be added, either by the system itself or by a user, such that the search engine may be able to distill (or to identify) documents or pages which are relevant both to the selected category as well as to the query keyword or the original request for information.

For example, when a search engine employing the inventive focused searching method is issued a request for information including a query keyword "jogging," several broad topic categories may either be identified by the search engine or specified as part of the original request. These topic categories may include, for example, health/fitness, sports, or shopping sites hosted by footwear manufacturers or retailers. The focused search techniques of the present invention identify category-specific keywords related to each respective topic category; the presence or absence of these category-specific keywords in a particular document may be considered as a factor in determining relevance.

Where the search is for pages containing the keyword "jogging" in the health/fitness category, for example, the pages containing category-specific keywords, such as "exercise" or "aerobic" in this example, may be ranked higher than those pages which contain many occurrences of the keyword "jogging" outside of the health/fitness context. Implicit query expansion involves the identification and addition of these category-specific keywords.

As will be described in detail below, the various embodiments of a focused search engine and method may be developed based upon hierarchically structured Web pages. Such an approach to focused Web crawling involves four key techniques: topic distillation on hierarchically structured Web pages; query processing which takes into consideration search or topic category specification; site distillation which takes into consideration focused topics; and integration of topic distillation and site distillation for focused crawling.

BRIEF DESCRIPTION OF THE DRAWINGS

The above-mentioned and other attendant advantages of the present invention will become more apparent through the following detailed description of the preferred embodiments thereof with reference to the attached drawings in which:

FIG. 1 is a simplified diagram illustrating exemplary query results provided by both a general search engine as well as one embodiment of a focused search engine.

FIGS. 5A and 5B show exemplary results of one embodiment of topic distillation.

DETAILED DESCRIPTION OF THE PREFERRED EMBODIMENTS

Turning now to the drawings, FIG. 1 is a simplified diagram illustrating exemplary query results provided by both a general search engine as well as one embodiment of a focused search engine. In the example shown in FIG. 1, a search engine has been issued a query with the keyword "NBA," the user's implicit intention being to find pages with information related to a recent National Basketball Association players' strike. As illustrated on the left side of FIG. 1, however, the conventional general purpose search engine identifies those pages containing the string "NBA" with a high term frequency (i.e. many occurrences of the term) first, ranking those pages higher than others, irrespective of their relevance to the players' strike. In this example, the user issuing such a query will find it difficult to locate particular pages of interest in the multiplicity of uncategorized and unorganized pages listed on the left side of FIG. 1.

In contrast, a focused search engine and method relate to locating and presenting information responsive to a query or other request generally as illustrated on the right side of FIG. 1. In one embodiment, topic categories may be identified which are all related to the information requested, in this example, the National Basketball Association, or NBA. Topic categories such as "Sports," "Entertainment," "History," "Business," and the like, may be presented such that the search may easily be narrowed to locate a particular topic of interest. In this example, information concerning a recent NBA players' strike would intuitively be located in the "Labor" category, at least, as shown in FIG. 1. The categorization need not be exclusive. That is, information related to an NBA players' strike may likewise be available in a "Recent News" category, if breaking news were available, or in the "Shopping Sites" category, if ticket sales were suspended during the strike, and so forth.

In one embodiment, a focused search engine and method may display query results organized by topic category, as shown on the right side of FIG. 1. Alternatively, categories of interest may be specified as part of the original search; in this alternative embodiment, it may be desirable only to display results falling within the specified topic category of interest. A focused search engine and method may perform implicit query expansion to add category-specific keywords to distill pages that are relevant not only to the query keyword but also to the topic category. For example, when a search requests pages containing the keyword "NBA" in the "History" category as illustrated on the right of FIG. 1, those pages with keywords associated with the History category, such as Hall of Fame, Scoring Titles, Statistics, and so forth, may be ranked higher than those pages with only the keyword "NBA" appearing many times.

Topic Distillation

Figure 2:
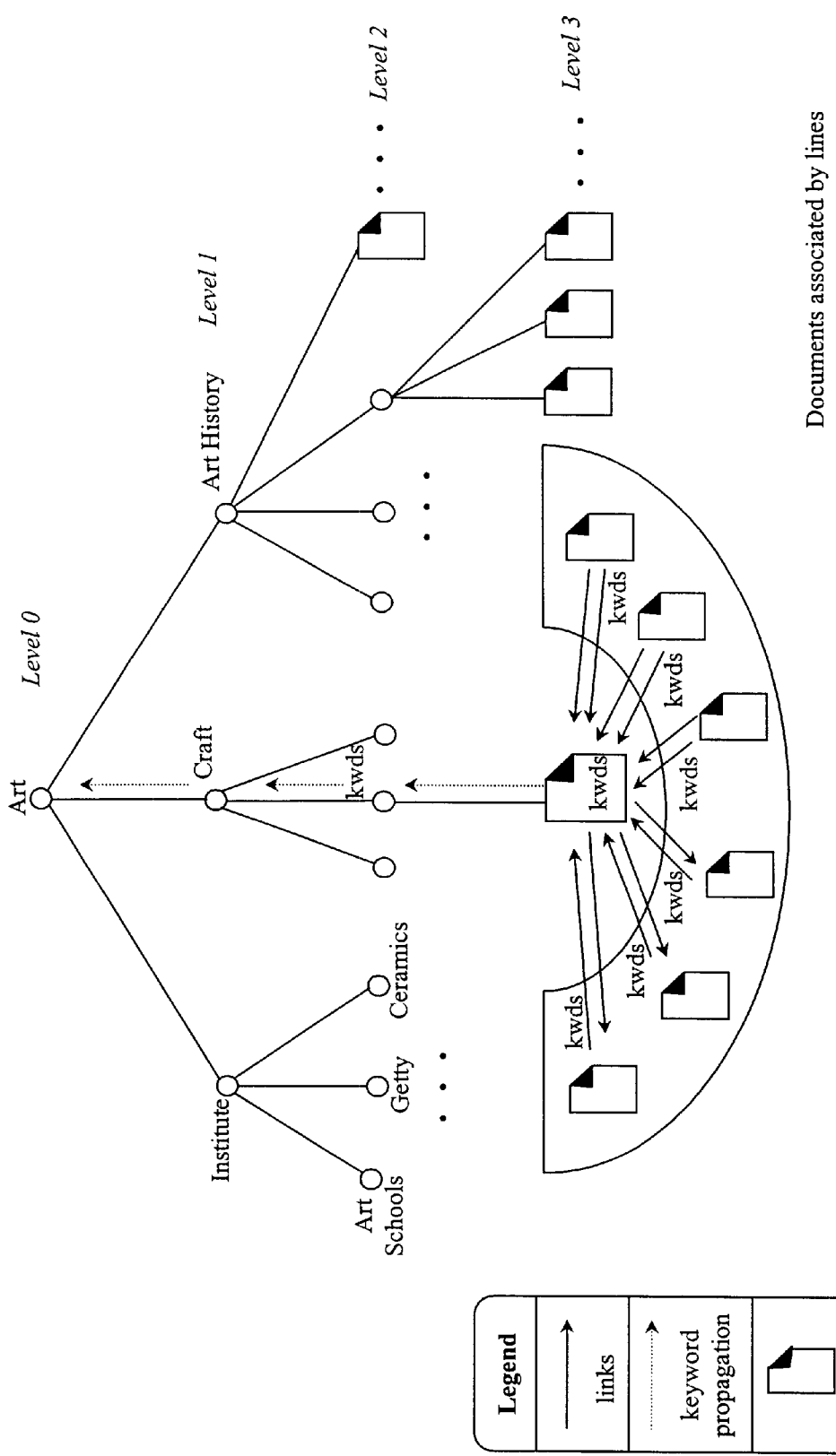
FIG. 2 is a simplified diagram illustrating an example of the hierarchical categorization and indexing structure of the World Wide Web, and further illustrating one embodiment of keyword propagation through neighborhood documents by link.

FIG. 2 is a simplified diagram illustrating an example of the hierarchical categorization and indexing structure of the World Wide Web (WWW or Web), and further illustrating one embodiment of keyword propagation through neighborhood documents by link. The Web generally comprises a plurality of documents, or pages, which are authored in HyperText Markup Language (HTML), Extensible Markup Language (XML), or other markup formats. The major difference between these HTML (and other markup) documents and ordinary text documents is that Web pages are "semi-structured" and have many parts, including Uniform Resource Locator (URL), title, body, link, anchor, highlighted words with special fonts, meta keywords, meta descriptions, and so forth. A given page's URL serves as a mechanism for identifying and locating the particular page, and the links associated with a given page allow a user to access other pages by traversing selected links. Further, each page is "located" within a certain domain, which is commonly based upon the URL.

One way to conceptualize the structure of a complicated search space such as the Web is to categorize the documents as illustrated in FIG. 2, with topic category nodes represented by the small circles. In the example shown in FIG. 2, the top level category, "Art" at Level 0, has three sub-categories at Level 1, namely: "Institute"; "Craft"; and "Art History". These sub-categories, in turn, each may have additional sub-categories at Level 2, which, themselves, may be segmented into further sub-categories at Level 3, and so on. Each category or sub-category may contain one or more pages which contain material relevant to the category.

As noted above, a method of focused searching may advantageously employ a strategy referred to as topic distillation. This process, involving keyword extraction and propagation, enables a focused search engine to target a specific topic category of interest so as to identify the most relevant material in the search space. In one embodiment, the keyword extraction and propagation schemes utilized by a topic distillation process may involve three steps: document keyword extraction; keyword propagation through neighborhood documents by link; and keyword propagation through the category tree structure. These schemes will now be described in detail.

Document Keyword Extraction

A focused search engine may operate under the theory that the different parts of a Web document (URL, title, body, link, anchor, highlighted word, etc.) may advantageously be assigned different respective weights when considering page relevance. For example, the presence of a keyword in the title of a page may generally be considered more of an indication of that page's relevance with respect to the keyword than the presence of that same keyword buried in the body of the document or located elsewhere. For example, relevance weights may be assigned to HTML documents or pages not only according to the mere presence of a keyword, but also according to the location of that keyword within the overall structure of the HTML document; as noted above, it is within the scope and contemplation of the present invention to employ a focused search engine and method in the context of XML and other markup language documents as well.

Relevance weights, with respect to a particular request for information or query search term or keyword, may be at a maximum in situations where the keyword is present in the area of the document that is most indicative of relevance, whereas the weights may be scaled down in situations where the keyword is located in an area of the document that is typically less related to relevance. The weight assigned to a page having a keyword in the title may be a relatively high value, for example, 100%–81% of some predetermined relevance factor associated with the particular keyword. The weight assigned to a page having that same keyword in the meta keyword section of the document may have a slightly lower relative value, for example, 80%–71% of the same predetermined relevance factor. Finally, the weight assigned to a page having the same keyword in the meta description may have an even lower relative value, for example, less than or equal to 70% of the keyword's predetermined relevance factor. The above percentage ranges are given by way of example only, and are not intended to be construed in any limiting sense.

In one embodiment, the information or text in the document body itself may not be used in the keyword search, as described above. In examining markup language documents or Web pages for the presence of keywords or search terms, another embodiment of a focused search engine may sample the information contained in the title, body, and the meta description fields, and other locations in the document. In this manner, the computational cost and system overhead required by the search may be reduced substantially, while the results are improved as well. Additionally, the method may extract only proper names or words that are in noun form for further investigation; such an approach limits system resources which must be devoted to the search.

Once all the words from the relevant portions of a document are parsed, a focused search engine may, for example, perform the following operations for each extracted word.

First, a check may be performed to determine if the word is contained in a "stop word list," i.e. a list of words which are not likely to be relevant search terms in any event. For example, words such as "a," "the," and "we" may be included in this list; these words may be considered so common as to be irrelevant. If the word is found in the stop word list, that word may be discarded as irrelevant; if the word is not found in the stop word list, a focused search may continue as follows.

Next, a check may be performed to determine if the word can be found on WordNet, an on-line lexical dictionary (G. A. Miller, *WordNet: A Lexical Database for English*, Communications of the ACM, pages 39–41, November 1995). If the word is not found in WordNet, that word may be retained as a keyword and treated as a proper name; if the word is found in WordNet, a focused search may continue as follows.

A check may be performed to determine if the word has a noun form. If the identified word has a noun form, its root form may be retained as a keyword (i.e. the root word "car" may be extracted from the plural form "cars"). The conversion to the root form may use the morphing functions provided by WordNet, for example.

Keyword Propagation Through Neighborhood Documents By Link

Since the structure of the Web encourages hypertext and hypermedia document authoring in markup languages such as HTML and XML, for example, Web authors tend to create documents which are composed of multiple pages connected by hyperlinks. Given the powerful and versatile methods available to Web authors, it is common for Web documents to be authored or arranged in multiple ways. For example, in a very simple case, all of a particular document's information may be presented on a single physical page. Conversely, a single document may be structured such that information is presented on multiple pages; in this case, a main page typically contains hyperlinks to other pages containing related information. When a Web site, such as www.nec.com, for example, is classified into categories, the editor or classifier examining the page contents tends not only to consider the contents on the main page, www.nec.com, but also the pages linked by www.nec.com, i.e. the pages which are accessible from www.nec.com. Similarly, the contents of the documents linking into www.nec.com may likewise be useful in terms of classifying or categorizing www.nec.com and its contents.

Those of skill in the art will appreciate that the foregoing description of markup language document structure and organization is not limited to the context of the Web, but may also be applicable to other search spaces. By way of example, intranets, Local Area Networks (LANs), Wide-Area Networks (WANs), and other vast search spaces may be comprised of markup language documents which may be structured, linked, and categorized as described above. A focused search engine and method may advantageously be used in conjunction with these search spaces. While the following discussion is directed primarily to the Web by way of example and for simplicity, it should be appreciated that the utility of the search engine and method described herein is not limited to the Internet or the World Wide Web.

Hypertext authoring and the associated complicated Web structure has, accordingly, posed new challenges with respect to the problem of automatic classification. One study (described in Soumen Chakrabarti, et al., *Enhanced Hypertext Categorization using Hyperlinks*, in Proceedings of the 1998 ACM SIGMOD Conference, 1998) indicates that, although a sophisticated automatic classifier can perform reasonably well on a news database or a patent database, for example, that same classifier performs badly on a similar sample from a large Web site, for instance, www.yahoo.com or www.nec.com, as discussed above. Given the increasing complexity of the search space, integration of content analysis and link analysis is becoming increasingly essential in Web document classification.

Returning now to FIG. 2, one embodiment of keyword propagation through neighborhood, or "neighboring," documents by link is shown. This method of "propagating" keywords takes into account the linked structure of the hypertext pages which make up the search space to be crawled by a focused search engine. As shown at the bottom central portion of FIG. 2, a focused search engine may recognize not only keywords contained in a particular document, per se, but may also recognize a set of keywords contained in that document's neighboring documents which are connected by hyperlinks. In operation, a focused search engine and method may assign a weight to each page in the category tree according to the keywords contained in that page as well as the keywords contained in the neighboring pages linked thereto.

Keyword weights, W, may propagate with a decay factor α, for example, determined according to the number of links required to navigate between two respective pages. For a given page, Dock, a corresponding weight of all the keywords may be calculated as follows:

$$W_{Doc_k} = \alpha \times \sum_{i=1}^{n} W_{Doc_i}$$

where $Doc_1, Doc_2, \ldots, Doc_n$, are the documents linking to Dock or linked by Dock directly. A decay factor α for use in the above equation is preferably selected such that 0<α<1.

Such a range of values for the decay factor accommodates, for example, embodiments utilizing unique α values for: documents in the same domain linking to indexed pages (in-links); documents in the same domain linked to indexed pages (out-links); documents in a different domain linking to indexed pages; and documents in a different domain linked to indexed pages. Such an embodiment contemplating different α values for the different link relationships between pages may be based upon the assumption that documents in the same domain tend to be more likely to contain similar information than documents in different domains; that is, the information contained in a particular document in a given domain tends to be more related to, and thus more relevant with respect to, information contained in other documents in that same domain than to information outside of that domain.

Keyword Propagation Through The Category Tree Structure

As noted above, FIG. 2 illustrates an exemplary "category tree" for the general topic "Arts." The tree is shown as branching from the main topic category node (Level 0). By way of example only, the structure of FIG. 2 illustrates several sub-categories associated with "Arts" (the Level 0 general topic category). Sub-categories such as "Institute" and "Craft" are shown at Level 1. It will be appreciated by those of skill in the art that each category at any given level in the tree structure may contain both documents as well as sub-categories. For example, while "Institute" is a sub-category of "Arts" on the one hand, "Institute" may contain certain documents and also may have its own sub-categories, on the other hand.

A focused search engine may propagate keywords in a "bottom-up" fashion, that is, from a lower level to a higher level. Similar to the foregoing keyword propagation by link, the keywords associated with a particular topic category $C_l$ may be determined through a summation of the keywords in the documents within $C_l$ itself as well as the keywords contained in documents within the various sub-category nodes under the topic category in question. In a similar manner as described above with respect to weights assigned to individual documents, weights or scores may be assigned to each topic category, with these scores propagating through the category tree with a decay factor Γ, for example, determined according to the number of category levels traversed. The keyword weights, W, at any given topic category node C at the $l_i$ level may be calculated as follows:

$$W_k^{li} = \Gamma \times \sum_{Node} W_k^{li+1}$$

where k is the number of distinct keywords found in the Web document collection and Node is the set of all sub-category nodes and document nodes immediately below C (i.e. at the $l_{i+1}$ level). The keyword scores at each topic category node may be calculated in a bottom-up fashion. The decay factor Γ for use in the above equation is preferably selected such that 0<Γ1.

The keywords selected as important keywords for each topic category node may represent a subset of all the keywords identified and extracted by the foregoing processes. Note that keyword extraction for documents may generally be based upon a "local analysis" as described above. In other words, the selection of important keywords for a given document may be independent of keywords extracted from other documents, provided that there is no direct link between the documents. In performing the topic distillation task for determining important keywords for an entire topic category, however, analysis of global distribution of the keywords may also be considered, as discussed in detail below. This global analysis has been experimentally proven to provide improved results with respect to information retrieval operations (see, e.g. Jinxi Xu and W. Bruce Croft, *Query Expansion Using Local and Global Document Analysis*, in Proceedings of the 19th Annual International ACM SIGIR Conference, Zurich, Switzerland, 1996).

Figure 3:
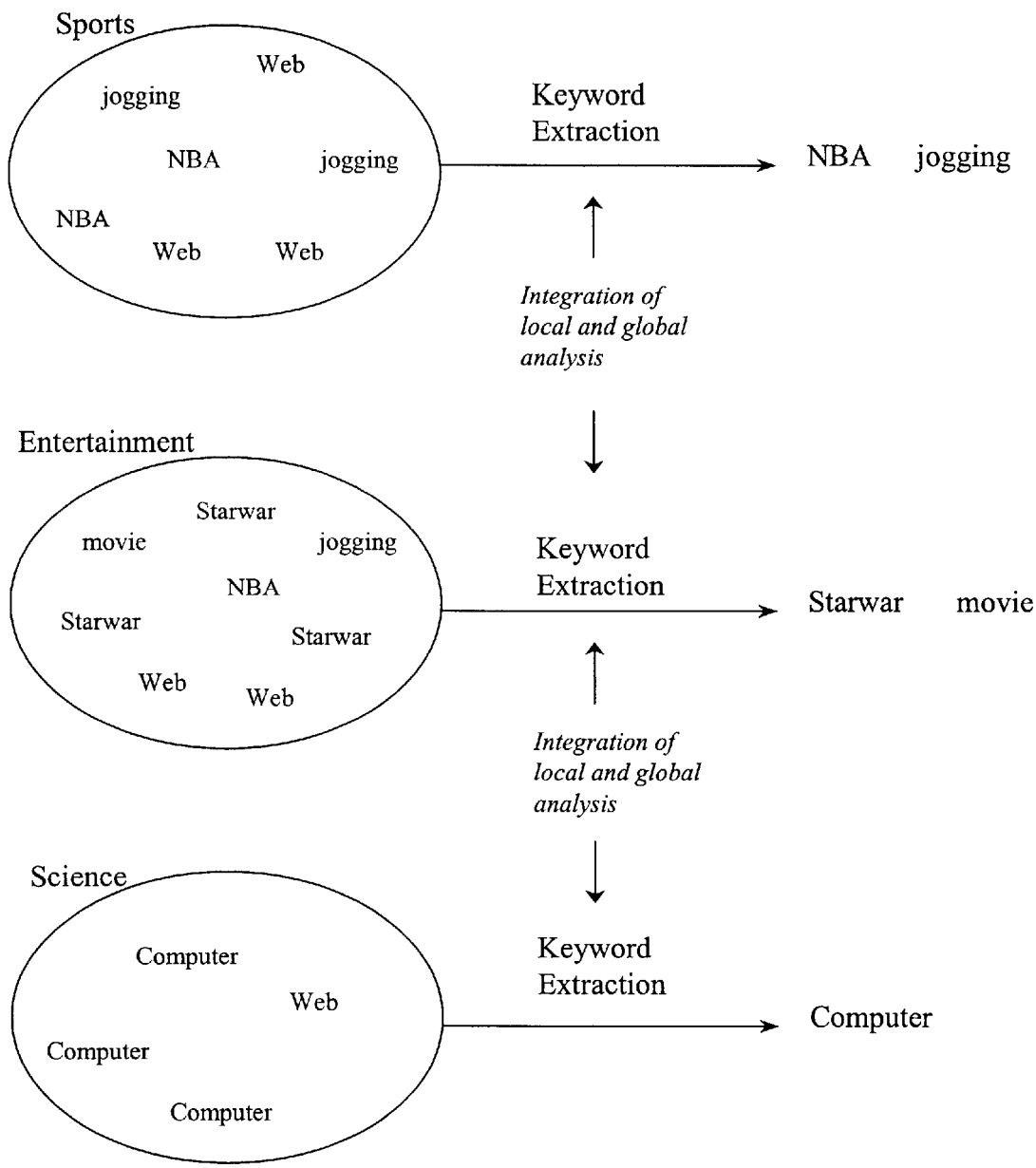
FIG. 3 is a simplified diagram illustrating one embodiment of topic distillation.

FIG. 3 is a simplified diagram illustrating one embodiment of topic distillation which may be employed by a focused search engine. Responsive to a query or other request for information, the focused searching method may determine that the most important keywords in the "Sports" category in this particular example are "Web," "Jogging," and "NBA." This determination may be based upon local analysis of all the documents in this topic category as well as its attendant sub-categories. The results of the keyword extraction are illustrated as the terms shown within the ovals on the left side of FIG. 3.

Next, a global keyword distribution analysis may be performed, during which a focused search engine and method may determine the following, for example: "Web" is not an important keyword, since such a generic term is not useful for discriminating the documents in the "Sports" category from documents in other topic categories; "NBA" is the most important keyword, considering both local analysis and global keyword distribution analysis, since "NBA" is a very discriminating topic among all categories due to its uniqueness; and similarly, "Jogging" is a moderately important keyword with respect to the "Sports" category, though not quite as discriminating across topic categories as NBA. In FIG. 3, this process is represented by the "Keyword Extraction" step. As will be apparent to those of skill in the art, various methods may be utilized to determine which keywords contained within the plurality of documents are important with respect to the topic category as a whole.

In the embodiment illustrated in FIG. 3, two constraints may govern topic distillation: local analysis may be employed to sort keywords according to relevance scores; and global analysis may be employed to remove keywords which occur in more than 50% of the documents and sub-categories one level down. The former constraint yields, for example, the keywords in each category on the left side of FIG. 3. The latter constraint, on the other hand, is the mechanism by which "Web" was determined to be irrelevant with respect to the "Sports" category in the example above, and may provide the distilled topics on the right side of FIG. 3. Those of skill in the art will appreciate that this integration of local analysis and global analysis for topic distillation is similar to the concept of TF×IDF in the information retrieval field (see, e.g. Karen Sparck Jones and Peter Willett (editors), *Readings in Information Retrieval.* Morgan Kaufmann, San Francisco, Calif., USA, 1997).

In particular, the significance of the factor TF (term frequency) is based upon the theory that documents which contain a particular keyword relatively frequently should receive a higher relevance ranking than documents which contain relatively fewer occurrences of the same keyword. This concept is similar to the present local analysis of document keyword occurrence positions; for example, where a keyword appears in both the title and in the meta description locations of a document, that document may be assigned an appropriately high relevance score, as discussed above. On the other hand, the second factor, IDF (Inverted Document Frequency), operates to reduce the importance of a keyword if such a keyword appears in most of the documents analyzed. This concept is similar to the present global keyword distribution analysis.

Figure 4:
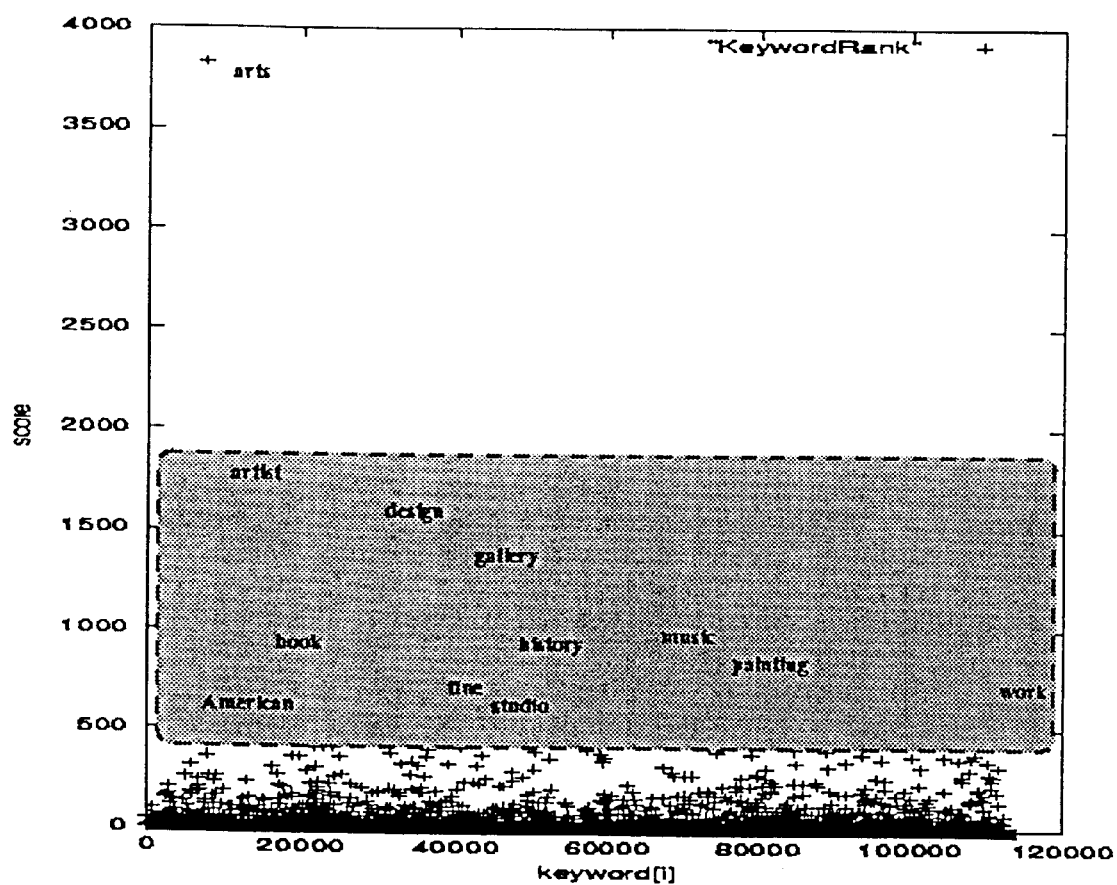
FIG. 4 is a graphical representation of an exemplary keyword distribution.

As an example of a typical situation encountered by Internet search engines, FIG. 4 is a graph representing an exemplary keyword distribution and illustrating the motivation for employing effective global analysis in a focused search engine and method utilizing topic distillation. FIG. 4 depicts results of experiments conducted on 71,349 documents in the "Arts" category, i.e. the node at the top level of the category tree illustrated in FIG. 2. The plot shows 113,863 data points (the total number of extracted keywords). In FIG. 4, the relevance score, or keyword rank, of each keyword in the Arts category is represented by the ordinal value. Some experimental observations are summarized as follows.

As FIG. 4 shows, the keyword "art" has the highest score, around 3800. The high score notwithstanding, a focused search engine may not select "art" as among the distilled topics because the generic term may be determined to be too general. This determination may be based upon an examination of the word's distribution in the sub-categories of the "Arts" category, as discussed above.

As shown in FIGS. 5A and 5B, on the other hand, the keyword "art" may suitably be selected among the "distilled topics" for particular sub-categories of "Arts," namely, the sub-categories "Institute" and "Craft." This may be appropriate because the word "art" is not a particularly "dominating" keyword within the particular sub-categories Arts/Institute and Arts/Craft, and therefore, is more discriminating in these contexts than it is with respect to the broader category of "Arts" in general.

As a general rule, a focused search engine may tend to favor identifying words such as those appearing in the middle of the highlighted area in FIG. 4 as likely and most suitable for characterization as "distilled topics." Words such as these generally have a relatively balanced ranking in terms of both local analysis as well as global distribution analysis.

Query Processing

A focused search engine and method may utilize a unique approach to the task of query processing. As noted briefly above, a method of focused searching may be adapted to identify topic categories of interest of its own accord (through implicit query expansion, i.e. topic distillation techniques), or it may be responsive to an explicit specification of a particular topic category. This specification may be part of the original query or request for information. In one embodiment, for example, query processing or a search for requested information may generally be conducted as follows in the case where one or more query keywords are specified, but no categories of interest are specifically indicated.

A focused search may use the specified keywords so as to identify a set of matched, or relevant, topic categories to search; this identification may be based upon the hierarchical category tree structure, such as depicted in FIG. 2, inherent in the infrastructure of the search space. Additional, representative keywords may then be identified (from the pages or documents found to be relevant to the explicit keyword terms) and selected so as to expand the query terms to retrieve additional relevant documents. In other words, a focused search may utilize issued query keywords to identify relevant topic categories which were not specified in the original request for information. Category-specific keywords may then be extracted from the various documents within the identified relevant categories, and these additional keywords may be employed to expand the search in order to provide complete, categorized information concerning the topic of interest.

With reference to the right side of FIG. 1, for example, when a search requests pages containing the keywords "Final" and "NBA" specifically in the "Sports" and "History" categories, a focused search engine and method may insert additional keywords related to the Sport and History categories, respectively, to form two queries for submission to the database. In this manner, a different set of relevant documents may be selected for each respective topic category. The documents containing the required query keywords ("NBA" and "Final") and additional keywords related to the Sports category may be ranked higher than the documents containing only the query keywords "NBA" and "Final." Similarly, the documents containing the query keywords and additional keywords related to the History category may be ranked higher than the documents containing only the query keywords or keywords related to other (i.e. non-specified) categories.

In one implementation, a focused search engine and method may query the document database with the keywords "NBA" and "Final" based on a traditional Boolean model, and subsequently use the category-specific keywords to rank the extracted documents based on a vector model. In one embodiment, for example, a vector model of information retrieval may be summarized as follows, where $K_i$ is a category or index term, $d_j$ is a document, and $w_{ij} \geq 0$ is a weight associated with the pair $(K_i,d_j)$. The weight may be considered as quantifying the importance of the index term for describing document semantic content, and may simply be determined based upon keyword occurrence frequency. The weight associated with each index term $K_i$ in the category-specific keyword vector, $Q_{category}$, may be determined by the system, for example, through topic distillation discussed above; alternatively, the weight associated with each index term may be assigned, for example, by a system administrator. The similarity between the document vector and the category-specific keyword vector may be measured, for example, by the cosine of $\theta$ between $d_j$ and $Q_{category}$.

In an alternative implementation, for example, a focused search engine and method may retrieve documents purely based on a vector model, where the document may be represented by a vector of a pair $(K_i,w_i)$ for all words found in the document collection. When the two query terms, $K_x$ and $K_y$, are used to search the Sport category, for example, the weights $w_x$ and $w_y$ may be set to 1, and all $K_i$ which are not relevant to the Sport category may be set to 0. Subsequently, the similarity between the modified query vector and the category-specific term vector may be computed. With respect to the category-specific term vector, it may be desirable that all the weights associated with terms which are not relevant to the category-specific keywords are set to 0; in this manner, only the query keywords and the category-specific keywords may be taken into consideration in the process of information retrieval.

Incorporation of Site Distillation

The concept of site distillation is an important aspect of focused crawling with respect to vast search spaces. In some conventional search engines, such as, for example, NEC's NetPlaza (NEC Corporation, NetPlaza Search Engine; information available at http://netplaza.biglobe.nejp/ (in Japanese)), Google (see, e.g. Lawrence Page and Sergey Brin, *The Anatomy of a Large-Scale Hypertextual Web Search Engine*, in Proceedings of the 7th World-Wide Web Conference, Brisbane, Queensland, Australia, April 1998), and Clever (see, e.g. Soumen Chakrabarti, et al., *Automatic Resource Compilation by Analyzing Hyperlink Structure and Associated Text*, in Proceedings of the 7th World-Wide Web Conference, pages 65–74, Brisbane, Queensland, Australia, April 1998), link analysis is performed in order to rank query results based on their in-degree, i.e. the number of pages linking to a particular document.

The foregoing conventional search engines assume that the quality of a document can be "assured" by the number of links pointing to it. The idea of site distillation is to select a small subset of the most "authoritative" pages (i.e. those having a high in-degree) from a much larger set of pages within the search space. Only the most authoritative pages are selected for presentation as results of a search. An authoritative page is a page with many inward links, while a "hub" page is a page with many outgoing links. In addition, it is generally accepted that authoritative pages and hub pages are mutually reinforced; that is, good authoritative pages are linked by a large number of good hub pages, and vice-versa.

After the tasks of keyword extraction and topic distillation are completed according to the foregoing description, a focused search engine may then perform the task of site distillation, i.e. selecting important pages for each topic category selected or identified. In addition to displaying the pages which are relevant to the particular topic category of interest, it may be desirable to display links for authoritative and hub pages as shown on the right side of FIGS. 5A and 5B. When a user selects an authority or hub link, the corresponding distilled Web site may be displayed. Recently, many distillation schemes have been derived from the basic algorithm presented by Chakrabarti et al. (Soumen Chakrabarti, et al., *Automatic Resource Compilation by Analyzing Hyperlink Structure and Associated Text*, in Proceedings of the 7th World-Wide Web Conference, pages 65–74, Brisbane, Queensland, Australia, April 1998). Some of the schemes are outlined in, for example, Lawrence Page and Sergey Brin, *The Anatomy of a Large-Scale Hypertextual Web Search Engine*, in Proceedings of the 7th World-Wide Web Conference, Brisbane, Queensland, Australia, April 1998; Krishna Bharat and Monika Henzinger, *Improved Algorithms For Topic Distillation In A Hyperlinked Environment*, in Proceedings of the 21st Annual International ACM SIGIR Conference, pages 104–111, Melbourne, Australia, August 1998; and Jeffrey Dean and Monika Henzinger, Finding Related Pages In The World Wide Web, in Proceedings of the 8th World-Wide Web Conference, Toronto, Canada, May 1999.

It will be appreciated by those of skill in the art, however, that these schemes merely utilize various link analyses in their respective approaches; a significant shortcoming is that the important sites, which are identified based upon a mere link analysis, will always be the same regardless of the particular topic of interest.

The focused search engine and method of the present invention, in contrast, are topic-focus sensitive. Rather than passing (or propagating) citation weights or scores based upon link in-degree to all linked pages or dividing citation scores evenly and passing those scores to all linked pages, the technique described herein divides such scores unevenly, as discussed below.

It will be appreciated that a focused search engine and method may selectively repeat the scoring and propagating processes. That is, page scores may be propagated and recomputed in an iterative procedure as is generally known in the art. Additionally, a normalization procedure may be employed during scoring.

Figure 6:
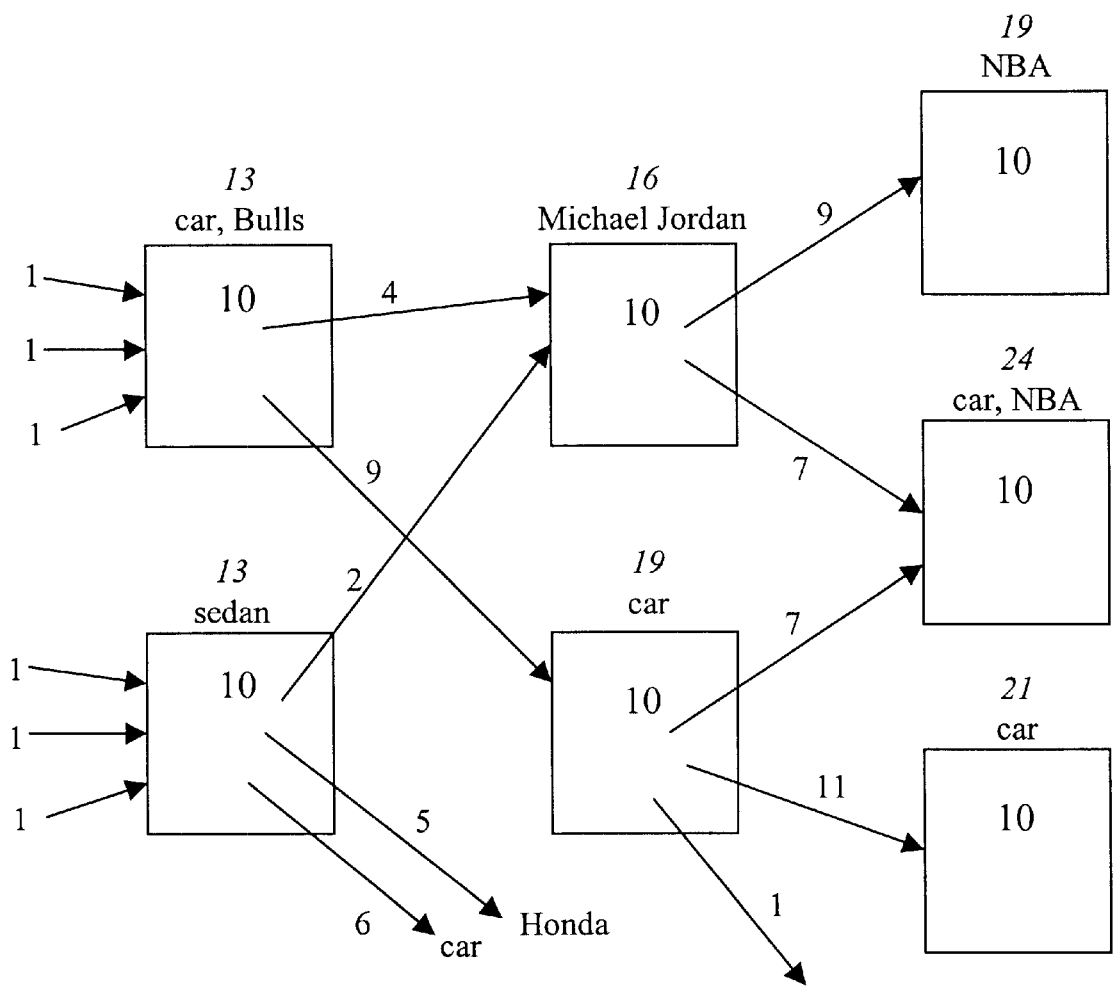
FIG. 6 is a simplified diagram illustrating one embodiment of site distillation.
Figure 7:
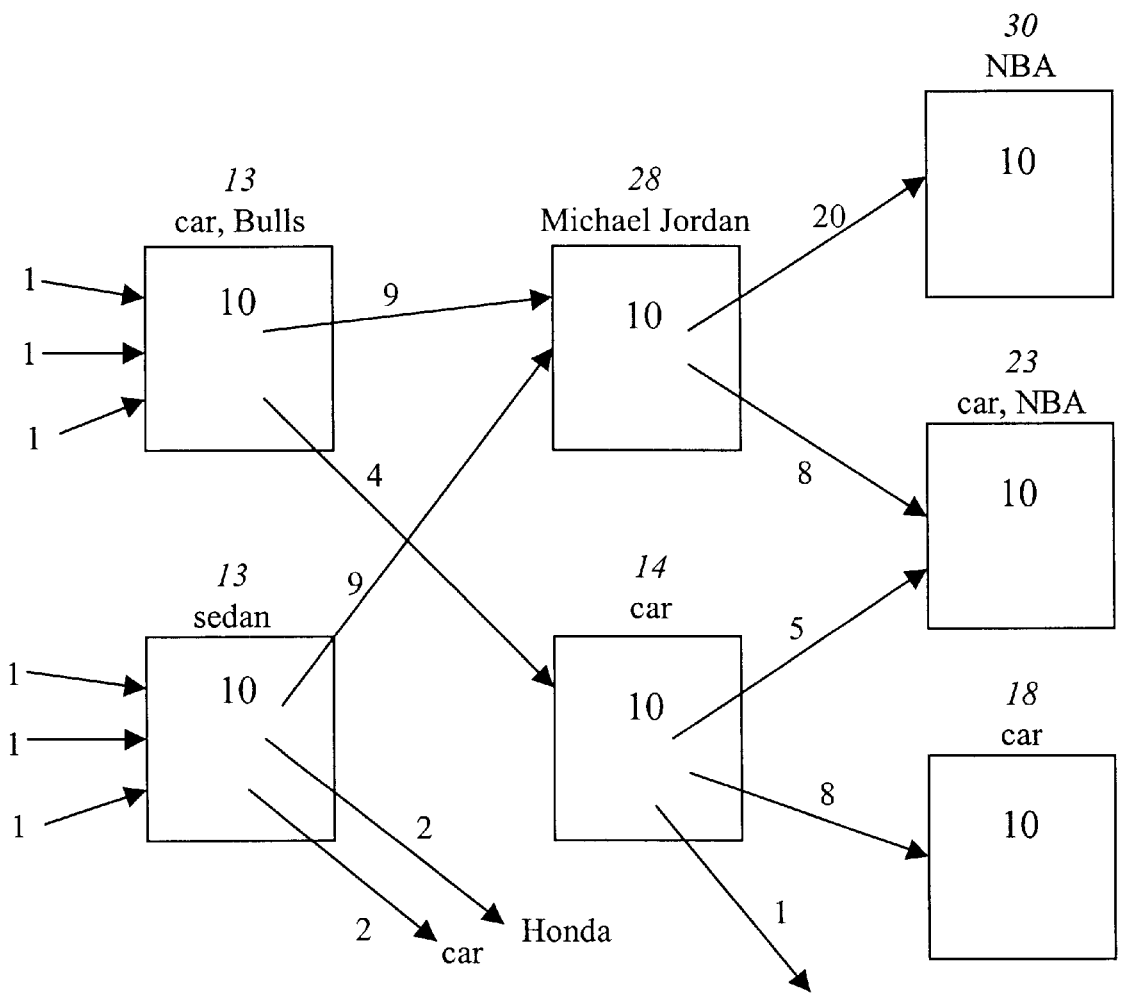
FIG. 7 is a simplified diagram, similar to that in FIG. 6, illustrating one embodiment of site distillation.

FIG. 6 is a simplified diagram illustrating one embodiment of site distillation. FIG. 7 is a simplified diagram, similar to that in FIG. 6, illustrating one embodiment of site distillation. Pages are represented by boxes; the topics addressed at each page are shown above each respective box. The arrows in FIGS. 6 and 7 represent links between the various pages. The weight or score for each page is indicated by the numeral inside the box representing the page, whereas the numerals above the link arrows are indicative of the weights or scores of neighborhood pages; these weights are propagated along the links from left to right in FIGS. 6 and 7. Similarly, the numerals above each page indicate the sum of the corresponding page's weight and the propagated weights of neighboring pages.

As illustrated in FIGS. 6 and 7, the sum (represented by the numeral above each page) of a given page's weight and the propagated weights of neighboring pages may be divided unevenly (according to relevance) when that sum is propagated to the next page. In this manner, documents containing content that is more relevant with respect to the focused topic receive higher scores than the documents that do not contain relevant content. Accordingly, the important pages selected may be different for different focused topics (in FIG. 6, the focused topic is "CAR," while in FIG. 7, the focused topic is "NBA").

Focused Crawling

Figure 8:
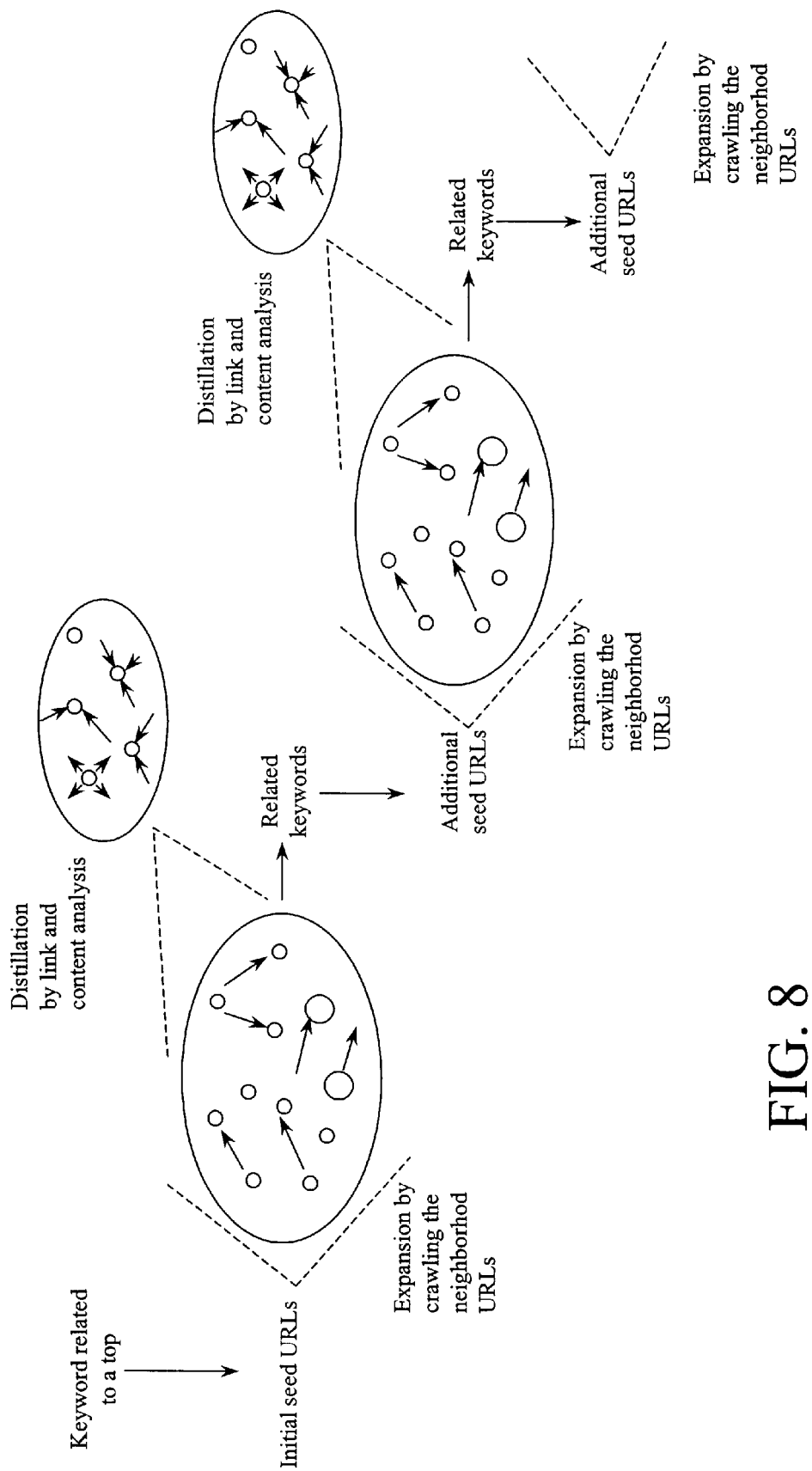
FIG. 8 is a simplified diagram illustrating one embodiment of focused crawling.

In accordance with an additional aspect of the present invention, a focused search engine and method may involve integration of site distillation and topic distillation for focused crawling. By way of example, FIG. 8 is a simplified diagram illustrating one embodiment of focused crawling wherein both topic distillation and site distillation operations are incorporated. The process starts at the left side of FIG. 8, when a focused search engine is provided with a search topic (i.e. car) or a set of keywords. A search engine employing the present methodology may select a set of pages from the search space which are located within the general category or categories associated with the topic or keywords. Alternatively, pages in other sources, i.e. outside the system, may be search. In addition, the system may employ pages or sets of pages, keywords or sets of keywords, as well as categories or other parts of the hierarchical search space tree as input.

The pages originally identified as most relevant may be used as seed URLs denoted as "initial seed URLs" at the left of FIG. 8. The seed URLs generally may contain material which is relevant to the subject matter of the query or request for information. Consistent with the theory that the seed URLs may be proximal to other pages containing similarly relevant information, the method of the present invention may then investigate pages which are linked to, or linked by, the seed URLs. Accordingly, the focused search engine may perform a link analysis, as described above, such that neighboring pages within a predetermined radius (e.g. within two links) may be gathered for examination. Next, the method may perform a site distillation process, as described above, in order to select pages which may be important relative to the information sought. In this manner, additional pages containing relevant material may be identified; these are denoted as "Additional seed URLs" in FIG. 8.

The method may be adapted to select additional topics which are relevant with respect to the original given topic (for example, "sedan" and "convertible," in the case where the original request was for information concerning "cars"). This selection of additional topics may be based upon various techniques such as occurrence, or term frequency, analysis. The method may utilize the newly selected relevant topics as a mechanism for identifying an additional set of pages within the categories associated with the new topics.

As will be appreciated from an examination of FIG. 8, the foregoing process may preferably be an iterative one, executed in a "scatter and gather" manner. In the scatter phase, the method may follow local hyperlinks in order to examine the contents of neighboring pages. In the gather phase, on the other hand, site distillation may be performed to discard irrelevant pages in favor of retaining only pages containing the most pertinent information relative to the focused topic search. The process may continue until the similarities between the newly derived topic and the original topic, as measured by relevance scores, are within a predetermined threshold value.

From the foregoing, it can be seen that the method of the present invention provides a versatile and thorough topic-focused search technique which integrates aspects of both topic distillation and site distillation. The preferred embodiments disclosed have been described and illustrated by way of example only, and not by way of limitation. Other variations on the invention will be apparent to those skilled in the art from the foregoing detailed disclosure and teachings. Thus, while only certain embodiments of the invention have been specifically described herein, it will be apparent that numerous modifications may be made thereto without departing from the spirit and scope of the invention.

What is claimed is:

1. A method of searching a search space comprising a plurality of pages; said method comprising:
   responsive to a request for information, determining a set of pages wherein each page in said set of pages is relevant to said request;
   performing topic distillation using said set of pages to determine a set of important keywords; and
   performing site distillation using said set of important keywords to determine a set of important pages.

2. The method according to claim 1 wherein said determining comprises locating said at least one of said plurality of keywords in a selected part of the structure of each page in said set of pages.

3. The method according to claim 1 wherein said performing topic distillation comprises keyword extraction.

4. The method according to claim 1 wherein said performing topic distillation comprises keyword propagation.

5. The method according to claim 4 wherein said keyword propagation is weighted.

6. The method according to claim 1 wherein said performing topic distillation enables implicit query expansion.

7. The method according to claim 1 further comprising selectively repeating said performing topic distillation and said performing site distillation.

8. The method according to claim 1 wherein said request for information further comprises a selected topic category.

9. The method according to claim 1 further comprising displaying results of said performing topic distillation.

10. The method according to claim 1 further comprising displaying results of said performing site distillation.

11. A computer-based system for searching a search space, the search space comprising a plurality of pages; said system comprising:
    means for receiving a request for information; and
    a focused search engine determining a set of pages wherein each page in said set of pages is relevant to said request, performing topic distillation using said set of pages to determine a set of important keywords, and further performing site distillation using said set of important keywords to determine a set of important pages.

12. The computer-based system according to claim 11 wherein said focused search engine locates said at least one of said plurality of keywords in a selected part of the structure of each page in said set of pages.

13. The computer-based system according to claim 11 wherein said topic distillation comprises implicit query expansion.

14. The computer-based system according to claim 11 wherein said topic distillation comprises keyword extraction.

15. The computer-based system according to claim 11 wherein said topic distillation comprises keyword propagation.

16. The computer-based system according to claim 15 wherein said keyword propagation is weighted.

17. The computer-based system according to claim 11 wherein said focused search engine selectively repeats said topic distillation and said site distillation.

18. The computer-based system according to claim 11 wherein said request for information further comprises a selected topic category.

19. The computer-based system according to claim 11 further comprising a display for displaying results of said topic distillation.

20. The computer-based system according to claim 11 further comprising a display for displaying results of said site distillation.

21. A method of searching a search space comprising a plurality of pages; said method comprising:

responsive to a request for information comprising a plurality of keywords and a one or more topic categories, determining a set of pages within the search space wherein each page in said set of pages contains at least one of said plurality of keywords and further contains information relevant to said one or more topic categories;

performing topic distillation using said set of pages to determine a set of important keywords; and performing site distillation using said set of important keywords.

22. The method according to claim 21 wherein said determining comprises locating said at least one of said plurality of keywords in a selected part of the structure of each page in said set of pages.

23. The method according to claim 21 wherein said performing topic distillation comprises keyword extraction.

24. The method according to claim 21 wherein said performing topic distillation comprises keyword propagation.

25. The method according to claim 24 wherein said keyword propagation is weighted.

26. The method according to claim 21 wherein said performing topic distillation comprises implicit query expansion.

27. The method according to claim 21 further comprising selectively repeating said performing topic distillation and said performing site distillation.

28. The method according to claim 21 wherein the request for information is a keyword query.

29. The method according to claim 21 further comprising displaying results of said performing topic distillation.

30. The method according to claim 21 further comprising displaying results of said performing site distillation.

31. A method of processing a query of a search space; said query comprising a plurality of keywords and said search space comprising a plurality of pages; said method comprising:

responsive to said query, determining a set of pages within the search space wherein each page in said set of pages contains at least one of said plurality of keywords;

assigning a score to each page in said set of pages in accordance with relevance to said query; and distributing said score of each page in said set of pages to neighboring pages in said set of pages in accordance with relevance to each of said plurality of keywords.

32. The method according to claim 31 further comprising selectively repeating said assigning and said distributing.

33. The method according to claim 31 wherein said determining comprises extracting keywords from each page within the search space to identify at least one topic category.

34. The method according to claim 33 wherein said distributing comprises keyword propagation.

35. The method according to claim 34 wherein said keyword propagation is weighted.

36. A method of processing a query of a search space; said query comprising a plurality of keywords and at least one topic category associated with at least one of said plurality of keywords; said search space comprising a plurality of pages; said method comprising:

responsive to said query, determining a set of pages within the search space wherein each page in said set of pages contains at least one of said plurality of keywords and further contains information relevant to said at least one topic category;

assigning a score to each page in said set of pages in accordance with relevance to said query; and distributing said score of each page in said set of pages to neighboring pages in said set of pages in accordance with relevance to each of said plurality of keywords and in accordance with relevance to said at least one topic category.

37. The method according to claim 36 wherein said determining comprises extracting keywords from said set of pages to identify category-specific keywords associated with said at least one topic category.

38. The method according to claim 37 wherein said distributing comprises keyword propagation.

39. The method according to claim 38 wherein said keyword propagation is weighted.

40. A method of focused crawling of a search space comprising a plurality of pages; said method comprising:

responsive to a request for information, determining a set of pages within the search space wherein each page in said set of pages contains information relevant to said request;

performing site distillation using said set of pages to determine a set of important pages; and examining said set of important pages to determine a set of keywords;

scoring each keyword in said set of keywords in accordance with relevance to said request; and selectively repeating said performing, said examining, and said scoring.

41. The method according to claim 40 wherein said determining comprises extracting keywords from said set of pages to identify at least one topic category relevant to said request.

42. The method according to claim 41 wherein said determining comprises keyword propagation.

43. The method according to claim 42 wherein said keyword propagation is weighted.

44. A method of focused crawling of a search space comprising a plurality of pages; said method comprising:

responsive to a request for information, determining a set of pages within the search space wherein each page in said set of pages contains information relevant to said request;

performing site distillation using said set of pages to determine a set of important pages, including assigning a relevance score to each page in said set of important pages in accordance with relevance to said request;

examining said set of important pages to determine a set of keywords;

scoring each keyword in said set of keywords in accordance with relevance to said request; and selectively repeating said performing, said examining, and said scoring.

45. The method according to claim 44 wherein said determining comprises extracting keywords from said set of pages to identify at least one topic category relevant to said request.

46. The method according to claim 45 wherein said assigning comprises weighted keyword propagation.

47. The method according to claim 46 wherein said weighted keyword propagation comprises dividing a relevance score unevenly prior to propagating said relevance score.

48. The method according to claim 44 wherein said request for information includes a keyword.

49. The method according to claim 44 wherein said request for information includes a topic category.

50. The method according to claim 44 further comprising displaying results of said performing site distillation on a display.

51. A method of site distillation for identifying information in a search space comprising a plurality of pages; said method comprising:

responsive to a request for information, determining a set of pages within the search space wherein each page in said set of pages contains information relevant to said request;

identifying one or more keywords relevant to said request;

assigning a score to each page in said set of pages in accordance with relevance to said request and in accordance with relevance to said one or more keywords;

distributing said score of each page in said set of pages to neighboring pages in said set of pages in accordance with relevance to said one or more keywords; and responsive to said distributing, computing a weight for each page in said set of pages in accordance with relevance to said request and relevance to said one or more keywords.

52. The method according to claim 51 wherein said identifying comprises extracting keywords from said set of pages.

53. The method according to claim 51 wherein said distributing comprises weighted keyword propagation.

54. The method according to claim 53 wherein said weighted keyword propagation comprises dividing said score unevenly prior to said distributing.

55. The method according to claim 51 wherein said request for information includes a keyword.

56. The method according to claim 51 wherein said request for information includes one or more specified topic categories.

57. The method according to claim 51 further comprising displaying results of said computing on a display.

58. The method according to claim 51 further comprising selectively repeating said distributing and said computing.

59. A method of topic distillation for identifying information in a search space comprising a plurality of pages; said method comprising:

responsive to a request for information, determining a set of pages within the search space wherein each page in said set of pages contains information relevant to said request;

for each page in said set of pages, extracting one or more keywords relevant to said request and assigning a score to each of said one or more keywords in accordance with relevance to said request;

propagating said score of each of said one or more keywords to neighboring pages in said set of pages;

weighting each page in said set of pages in accordance with said assigning and said propagating; and identifying a set of important keywords associated with said request.

60. The method according to claim 59 wherein said plurality of pages in said search space are arranged in accordance with relevance to one or more predetermined categories and wherein said method further comprises:

propagating said score of each of said one or more keywords from one of said one or more predetermined categories to another of said one or more predetermined categories; and weighting each of said one or more predetermined categories in accordance with said assigning and said propagating.

61. The method according to claim 59 wherein said propagating includes applying a neighboring page decay factor.

62. The method according to claim 60 wherein said propagating includes applying a category decay factor.

63. The method according to claim 60 wherein said request for information includes identifying said one or more predetermined categories.

64. A method of processing a query of a search space; said query comprising a plurality of keywords and said search space comprising a plurality of pages; said method comprising:

responsive to said query, determining a set of pages within the search space wherein each page in said set of pages contains at least one of said plurality of keywords;

identifying one or more topic categories relevant to said query;

determining, for each of said one or more topic categories, a set of important pages in accordance with relevance to said query and in accordance with relevance to said one or more topic categories;

assigning a score to each page in said set of pages in accordance with relevance to said query; and distributing said score of each page in said set of pages to neighboring pages in said set of pages in accordance with relevance to each of said plurality of keywords.

65. The method according to claim 64 wherein said query includes said one or more topic categories.

66. The method according to claim 64 wherein said determining a set of important pages includes utilizing a vector model.

67. The method according to claim 66 wherein utilizing said vector model considers relevance to said query more important than relevance to said one or more topic categories.

* * * * *

UNITED STATES PATENT AND TRADEMARK OFFICE
CERTIFICATE OF CORRECTION

PATENT NO. : 6,691,108 B2
DATED : February 10, 2004
INVENTOR(S) : Wen - Syan Li

It is certified that error appears in the above-identified patent and that said Letters Patent is hereby corrected as shown below:

Column 7,
Line 32, change "Dock" to -- $Doc_k$ --;
Line 41, change "Dock" to -- $Doc_k$ -- (both occurrences);

Column 8,
Line 8, change "$C_1$" to -- $C_i$ --;
Line 31, change " $0< \Gamma\ 1$" to -- $0 < \Gamma < 1$ --;

Column 11,
Line 35, change "http://netplaza.biglobe.nejp/" to
-- http://netplaza.biglobe.ne.jp/ --

Signed and Sealed this

Third Day of August, 2004

JON W. DUDAS
*Acting Director of the United States Patent and Trademark Office*